United States Patent [19]

Bowman et al.

[11] Patent Number: 4,760,675
[45] Date of Patent: Aug. 2, 1988

[54] POWER COMPARTMENT AND METHOD OF FABRICATING

[75] Inventors: Timothy S. Bowman, Parkersburg, W. Va.; Charles N. Domigan, Coolville, Ohio

[73] Assignee: Butler Manufacturing Company, Kansas City, Mo.

[21] Appl. No.: 945,821

[22] Filed: Dec. 24, 1986

[51] Int. Cl.⁴ .............................................. E04B 5/48
[52] U.S. Cl. .......................................... 52/221; 52/98; 52/715; 29/155 R; 72/379; 428/577; 174/48
[58] Field of Search ............... 52/221, 715, 370, 220, 52/98-100; 29/155 R; 72/379; 428/577; 174/48, 49

[56] References Cited

U.S. PATENT DOCUMENTS

| 932,197 | 8/1909 | Waite | 52/715 |
|---|---|---|---|
| 1,088,417 | 2/1914 | Harp | 52/715 |
| 3,005,293 | 10/1961 | Hunter | 52/712 X |
| 4,593,506 | 6/1986 | Hartman et al. | 174/48 X |

FOREIGN PATENT DOCUMENTS 103929 5/1938 Australia .............................. 52/370

Primary Examiner—David A. Scherbel
Assistant Examiner—Richard E. Chilcot, Jr.
Attorney, Agent, or Firm—Frederick J. Olsson

[57] ABSTRACT

A trench duct power compartment for use over a cellular raceway is fabricated by forming a rectangular-shaped blank and then stamping out a center section to leave portions which are contoured to the shape of the crests of the cellular raceway and thereafter bending the cut-out blank to simultaneously form upright side walls, downwardly extending concrete blockers together with connecting bottom end sections while leaving the bottom midsection open. The contoured portions of the concrete blockers having the same profile as the crests of the cellular raceway and snugly engage therewith.

4 Claims, 1 Drawing Sheet

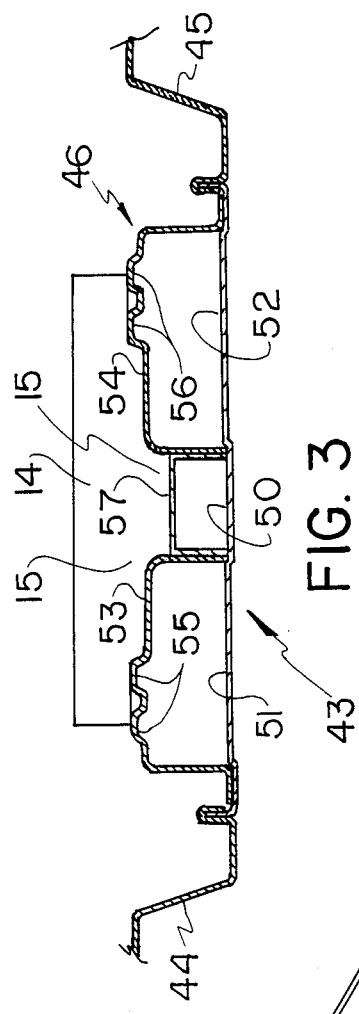
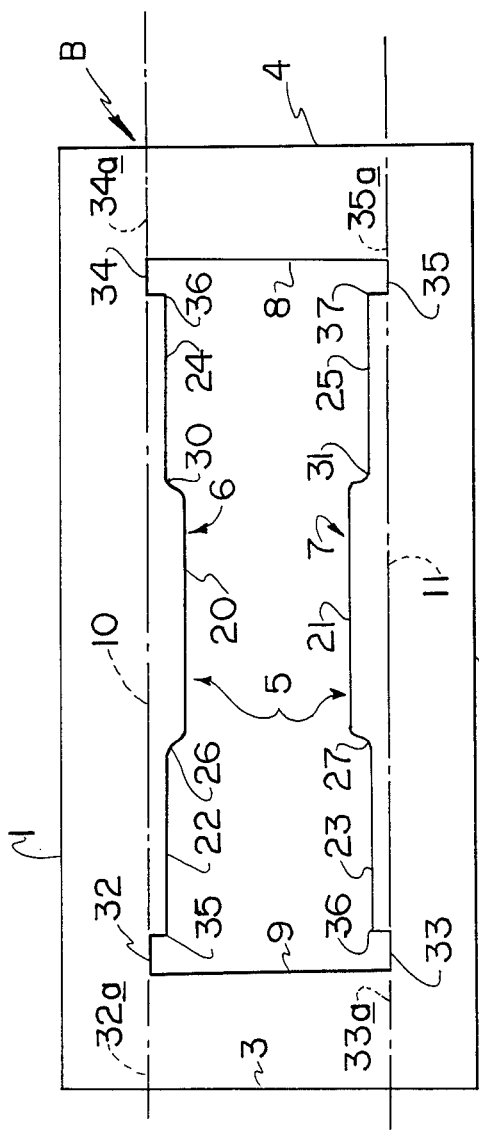
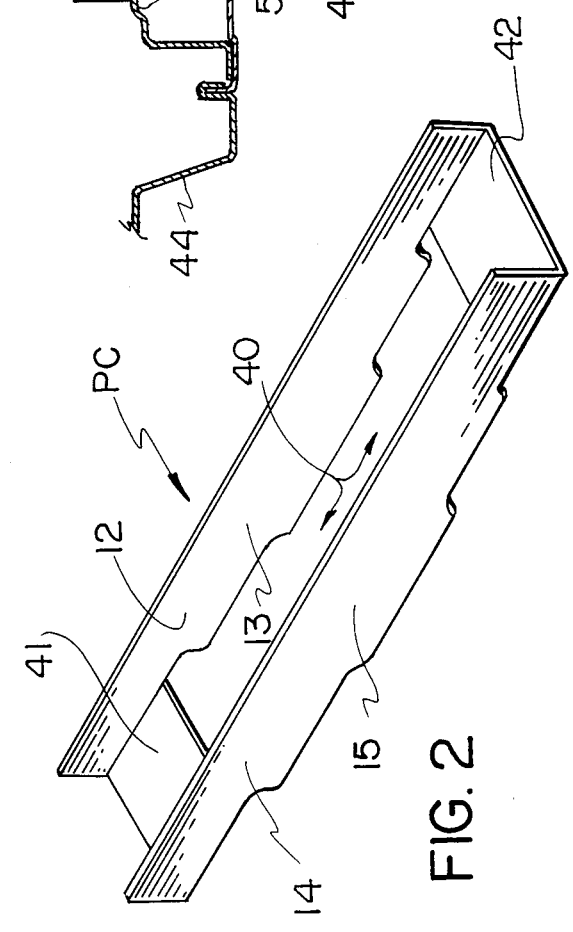

POWER COMPARTMENT AND METHOD OF FABRICATING

This invention relates in general to power and communication distribution systems in buildings of the type having floors which comprise a metal subfloor with an overlying layer of concrete, the subfloor including cellular raceways feeding trench duct of the kind having no bottom over the cellular raceway.

More specifically, the invention relates to a power compartment for such trench duct particularly where the trench duct is used over cellular raceway having a center power cell and communication cells on opposite sides of the power cell and wherein the crest of the power cell is offset downwardly from the crests of the communication cells.

In the above mentioned arrangement, the side walls of the trench rest on the crests of the communication cells. Therefore, between the crest of the power cell and the bottom of each side wall, there is a space which must be blocked off during the pour.

Thus, the invention contemplates a power compartment which is especially adapted for cellular raceway whose power cell has an off-set crest. The invention provides a single-piece power raceway which is bottomless over the power and communication cells while nevertheless incorporating concrete blocking means.

For fabricating such a power compartment, the invention contemplates forming a rectangular-shaped blank and stamping out a center section to leave portions which are contoured to the shape of the crests of the cellular raceway and then bending the cut-out blank to simultaneously form upright side walls and downwardly extending concrete blockers, the contoured portion of which are adapted to mate with the cellular raceway crests.

The principal advantages of the invention are, first, that the bottomless feature eliminates field cutting of an access hole in the bottom of the power compartment and, second, that the need for a sleeve or some other independent parts to serve as concrete blocking means is eliminated.

The invention will be described below in connection with the following drawings wherein:

FIG. 1 is a plan view of a flat blank which is stamped out and ready to put through a bending operation to form a power compartment;

FIG. 2 is a perspective view of a power compartment formed from the blank of FIG. 1; and FIG. 3 is an elevational view of the power compartment of FIG. 1 mounted over cellular raceway.

In FIG. 1 the blank B is a rectangular-shaped piece which has, by stamping or shearing or the like, been formed with longitudinal outer edges 1 and 2 which are spaced apart and parallel to one another together with transverse outer edges 3 and 4 which are parallel to one another and normal to the edges 1 and 2. The blank is typically formed from 14 gauge galvanized steel.

A contoured cutout 5 has been formed in the blank as by stamping. The cut-off 5 has contoured longitudinal inner edges 6 and 7 and transverse inner edges 8 and 9. We will identify the various parts of the contoured edges 7 and 8 and their respective relationship in a one-after-the-other manner. It will be understood, however, that the pattern is not followed in a stamping operation. Normally, the cut-out is stamped out in a single stroke of the punch or stamped out in a progressive die.

Referring to the dotted lines 10 and 11, these lines represent axes about which the blank B will be bent into the power compartment PC shown in FIG. 2. The material between line 10 and edge 1 constitutes a wall 12 of the power compartment. The material between the line 10 and the edge 6 constitutes the concrete blocker 13. Likewise, the material between line 11 and the edge 2 consitutes the wall 14 and the material between the line 11 and edge 7 constitutes the concrete blocker 15.

We will now comment on the parts of the contoured edges 6 and 7. Centrally of the blank B, the edges 6 and 7 have edge sections 20 and 21 which are spaced apart infacing relationship, are parallel to one another, and are of the same length.

To the left of the blank the edges 6 and 7 have edge sections 22 and 23 which are spaced apart in facing relationship, are parellel to one another, and parallel to the edge sections 20 and 21, are of the same length, and are respectively spaced outwardly from the edge sections 20 and 21. On the right-hand side there are similar edge sections 24 and 25 which face one another in parallel relationship, are parallel to the edge sections 20 and 21, are the same length, and are spaced outwardly respectively from the edge sections 20 and 21. The edge section 22 and the edge section 24 are co-planar. The edge section 23 and edge section 25 are also co-planar.

On edge 6, between the edge sections 20 and 22, is a joinder edge 26 in the form of a reverse bend and correspondingly on edge 7 between edge sections 21 and 23 is a joinder edge 27 also in the form of a reverse bend.

Still further on edge 6 between the edge sections 20 and 24 is a joinder edge 30 in the form of a reverse bend and on edge 7 between edge sections 21 and 25 is a joinder edge 31 in the form of a reverse bend.

Again referring to the left-hand side of blank B, the edges 6 and 7 have edge sections 32 and 33 which face one another in parallel relationship, are parallel to the edge sections 20 and 21, are of the same length, and are spaced outwardly respectively from the edge sections 22 and 23. It will be noted that the projections 32a and 33a of the edges 32 and 33 toward the outer transverse edge 3 coincide with the axes 10 and 11 and are bend lines.

Referring to the right-hand side of blank B, the edges 6 and 7 have edge sections 34 and 35 which face one another in parallel relationship, are parallel to the edge sections 20 and 21, are of the same length, and are spaced outwardly respectively from the edge sections 24 and 25. The projections 34a and 35a of the edges 34 and 35 toward the outer transverse edge 4 coincide with the axes 10 and 11 and are bend lines. The edges 32 and 34 are coplanar. Likewise, the edges 33 and 35 are coplanar.

On the edge 6, between the edge sections 22 and 32, is joinder edge 35 in the form of a reverse bend and on edge 7, between the edge sections 25 and 35, is joinder edge 37 also in the form of a reverse bend.

After the blank B is formed, it is then subject to a bending operation which bends the blank around the axes 10 and 11 which turns the blank in the channel configuration shown in FIG. 2 which is bottomless in the section indicated at 40. It will be apparent that the blank material between the edges 3 and 9 and the axes 10 and 11 becomes a bottom end section 41 and that the material between the edges 4 and 8 and axes 10 and 11 becomes a bottom end section 42.

In FIG. 3, we have illustrated a partial section of a metal subfloor 43 having deck sections 44 and 45 between which is blended a cellular raceway 46 of the kind previously mentioned.

The raceway 46 has a central power cell 50 and a pair of communication cells 51 and 52 on opposite sides of the power cell. The crests 53 and 54 of communication cells 51 and 52 are coplanar. The crest 53 includes the ribs 55 and the crest 54 includes the ribs 56. The crest 57 of the power cell is offset downwardly.

As will be apparent from FIG. 3, the concrete blocker portions 13 and 15 of the power compartment extend down in snug engagement with crests 53, 57, and 54 and that the end sections 41 and 42 rest on the ribs 55 and 56.

The side walls 12 and 14 may constitute the full height of the power compartment. However, it is preferred that the side walls 12 and 14 comprise the bottom portion of the side walls with the upper portion of each side wall comprising a strip having spring clips which provide a means for securing the strip and also for adjusting the desired height of the power compartment after the pour.

We have shown the power compartment PC to be symmetrical and of a length which is less than the width of the cellular raceway 46. It will be understood that the length may vary depending upon the particular application.

Before closing, it is to be noted that a cellular raceway having an off-set power cell crest may not employ rib structure on the communication cells. In such an event, the bend axes will be coaxial with the edges 22/24 and the edges 23/25.

What is claimed is:

1. The method of forming a blank into a power compartment for use over a cellular raceway having a power cell and a pair of communication cells on opposite sides of the power cell wherein the crest of the power cell is off-set downwardly from the crests of the communication cells, comprising the steps of:

forming a flat, rectangular-shaped piece of metal having first and second spaced-apart, parallel longitudinal outer edges and first and second transverse outer edges each normal to the longitudinal outer edges:

making a contoured cut-out in said piece as by:

forming first and second longitudinal inner edges which face on another, are spaced apart, are parallel to each other, and are of the same length;

forming third and fourth longitudinal inner edges which face one another, are spaced apart, are respectively parallel to said first and second longitudinal inner edges, are of the same length, and are respectively spaced outwardly from said first and second longitudinal inner edges;

forming a first reverse bend edge between said first longitudinal inner edge and said third longitudinal inner edge;

forming a second reverse bend edge between said second longitudinal inner edge and said fourth longitudinal inner edge;

forming fifth and sixth longitudinal inner edges which face one another, are spaced apart, the respectively parallel to said first and second longitudinal inner edges, are of the same length, and are respectively spaced outwardly from said third and fourth longitudinal inner edges;

forming a first transverse inner edge parallel to said first outer transverse edge and extending between said fifth and sixth longitudinal inner edges;

forming a third reverse bend between said third longitudinal inner edge and said fifth longitudinal inner edge;

forming a fourth reverse bend between said fourth longitudinal inner edge and said sixth longitudinal inner edge;

forming seventh and eighth longitudinal inner edges which face one another, are spaced apart, are respectively parallel to said first and second longitudinal inner edges, are of the same length, and are respectively spaced outwardly from said first and second longitudinal inner edges;

forming a fifth reverse bend edge between said first longitudinal inner edge and said seventh longitudinal inner edge;

forming a sixth reverse bend edge between said second longitudinal inner edge and said eighth longitudinal inner edge;

forming a second transverse inner edge parallel to said second transverse outer edge;

forming ninth and tenth longitudinal inner edges which face one another, are spaced apart, are parallel to said first and second longitudinal inner edges, are of the same length, and are respectively spaced outwardly from said seventh and eighth longitudinal inner edges;

forming a seventh reverse bend edge between said seventh longitudinal inner edge and said ninth longitudinal inner edge;

forming an eighth reverse bend between said eighth longitudinal inner edge and said tenth longitudinal inner edge;

the projections of said fifth and sixth inner edges in a direction toward said first outer transverse edge respectively constituting first and second bend lines and the projections of said ninth and tenth inner edges in a direction toward said second transverse outer edge respectively constituting third and fourth bend lines respectively coaxial with the first and said second bend lines; and bending the blank along each said bend line whereby for each bend line the blank material outboard of the bend line forms a compartment side wall and the material inboard of the bend line forms a concrete blocker.

2. A power compartment made in accordance with the method of claim 1.

3. The method of forming a blank into a power compartment for use over a cellular raceway having a power cell and a pair of communication cells on opposite sides of the power cell wherein the crest of the power cell is offset downwardly from the crests of the communication cells comprising the steps of:

forming a flat, rectancular-shaped piece of metal having first and second spaced-apart, parallel longitudinal outer edges and first and second transverse outer edges each normal to the longitudinal outer edges;

making a contoured cut-out in said piece as by:

forming first and second longitudinal inner edges which face one another, are spaced apart, are parallel to each other, and are of the same length;

forming third and fourth longitudinal inner edges which face one another, are spaced apart, are respectively parallel to said first and second longitudinal inner edges, are of the same length, and are respectively spaced outwardly from said first and second inner longitudinal inner edges;

forming a first reverse bend edge between said first longitudinal inner edge and said third longitudinal inner edge;

forming a second reverse bend edge between said second longitudinal edge and said fourth longitudinal inner edge;

forming a first transverse inner edge parallel to said first outer transverse edge and extending between third and fourth longitudinal inner edges;

forming fifth and sixth longitudinal inner edges which face one another, are spaced apart, are respectively parallel to said first and second longitudinal inner edges, are of the same length, and are respectively spaced outwardly from said first and second inner edges;

forming a third reverse bend edge between said first longitudinal inner edge and said fifth inner edge;

forming a fourth reverse bend edge between said second longitudinal inner edge and said sixth longitudinal inner edge;

forming a second transvere inner edge parallel to said second transverse outer edge and extending between said fifth and sixth longitudinal inner edges;

the projections of said third and fourth longitudinal inner edges in a direction toward said first outer transverse edge respectively consituting first and second bend lines and the projections of said fifth and sixth longitudinal inner edges toward said second transverse outer edge respectively constituting third and fourth bend lines respectively coaxial with the first and second bend lines; and bending the blank along each said bend line whereby for each bend line the blank material outboard of the bend line forms a compartment side wall and the material inboard of the bend line forms concrete blocker.

4. A power compartment made in according with the method of claim 3.

* * * * *